Dec. 1, 1942. F. E. TILBURY 2,303,668
AUTOMATIC HOOK SETTING DEVICE
Filed Aug. 21, 1941
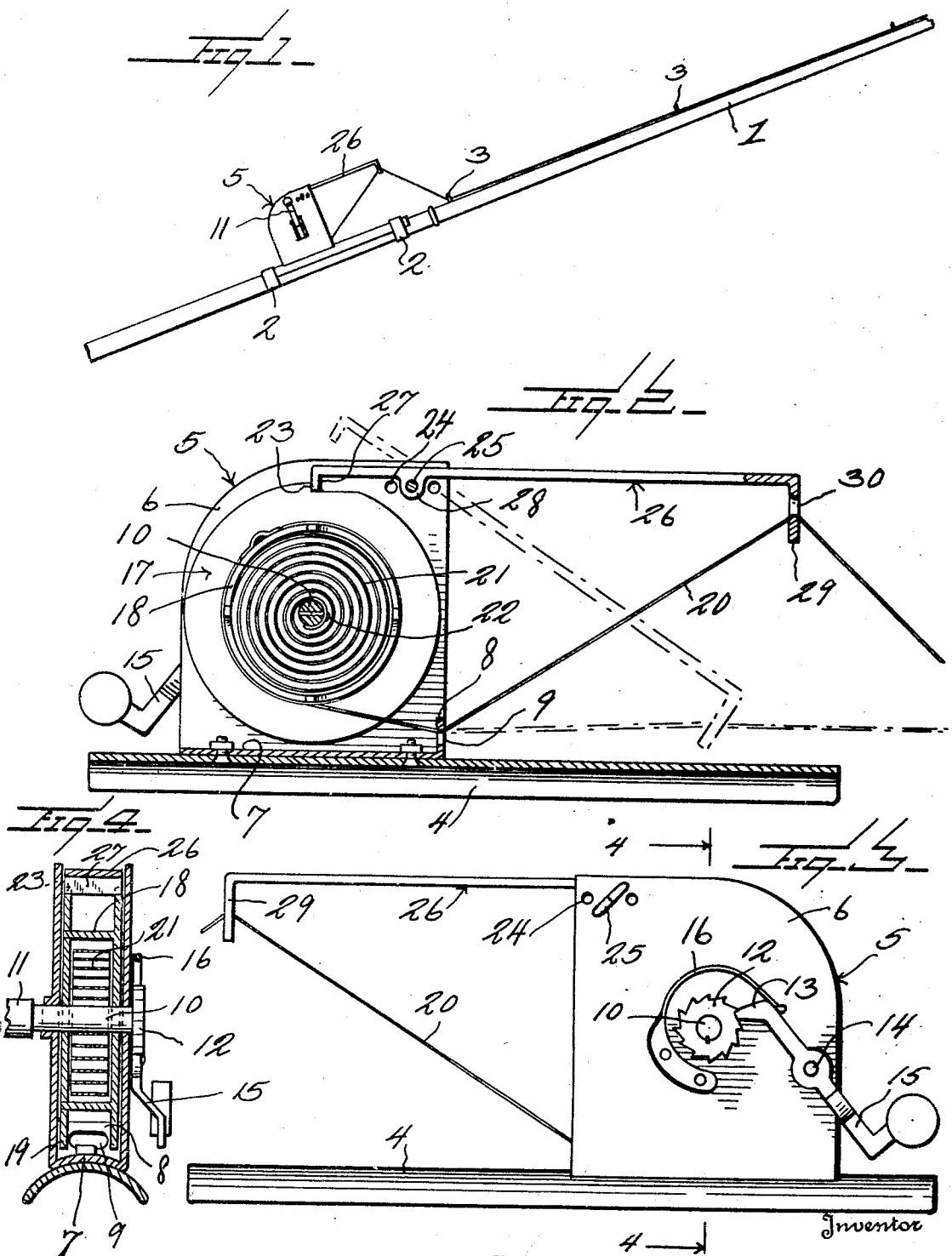
Inventor
Floyd E. Tilbury
By Watson E. Coleman
Attorney Patented Dec. 1, 1942

2,303,668

UNITED STATES PATENT OFFICE 2,303,668

AUTOMATIC HOOK SETTING DEVICE

Floyd Erwin Tilbury, Lonoke, Ark.

Application August 21, 1941, Serial No. 407,818

4 Claims. (Cl. 242—84.3)

This invention relates generally to the class of fishing and trapping and pertains particularly to a device for automatically setting a hook when the same has been taken by a fish.

The primary object of the present invention is to provide a fishing line reel device for use in still fishing, which is designed to impart a jerk to the fishing line when the fish hook has been taken by a fish or when a "nibble" is had, thereby relieving the fisherman of the necessity of maintaining a constant hold on the line and of watching the line so as to give the necessary quick jerk thereto when a nibble is had and also obviating the necessity of employing floats or bobbers to be watched by the fisherman in still fishing.

Another object of the invention is to provide a device of the character above described wherein the line carrier is in the form of a spool having a control spring interposed between it and a supporting shaft, together with a trigger with which the line is connected, which trigger maintains the spool against rotation in a direction to wind up the line when the spring is under tension, the trigger being tripped when a jerk is applied to the line, as in the taking of the bait or hook by a fish, whereby the reel is released and the spring takes control to apply a quick pull or jerk on the line which will effect the setting of the hook in the fish's mouth.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view illustrating the application of the automatic hook setting device to a fish pole, the device being shown in side elevation and in set condition.

Fig. 2 is a view in longitudinal section of the device showing the trigger in set position and also showing the trigger in broken lines in released or tripped position.

Fig. 3 is a view in elevation of the side of the device upon which the pawl and ratchet unit is mounted for holding the spring shaft when the spring is under tension.

Fig. 4 is a sectional view on the line 4—4 of Fig. 3.

Referring now more particularly to the drawing, the numeral 1 generally designates a conventional illustrated fishing rod having locking rings 2 by means of which the present device may be secured thereto and having the usual line guides 3.

The automatic hook setting device of the present invention comprises an elongated transversely arcuate base plate 4 which is set on and longitudinally of the fishing rod to be secured in position by the locking rings 2 which are slipped in the usual manner over the ends of the base.

Secured to the base is a housing 5 which comprises two spaced parallel vertical walls 6 joined together at their bottom by a bottom wall 7 which is secured in a suitable manner to the base 4, as shown in Fig. 2. At the forward end of the bottom 7 is an upstanding flange 8 through which is formed a line guide or eye 9. Extending transversely and between the walls 6 is a reel shaft 10 which is rotatably mounted in suitable bearings and which has attached thereto upon one side of the housing, preferably upon the right side, as shown in Fig. 1, a handle 11 by which rotation of the shaft 10 is effected.

Upon the opposite side of the housing from the handle 11, the shaft has keyed thereto a ratchet 12 and pivotally supported upon the wall 6 adjacent which the ratchet 12 is placed, is a pawl 13 which engages the teeth of the wheel 12. The pivot for the pawl 13 is indicated at 14 in Fig. 3 and a control arm 15 is connected with the pawl, as shown, and extends rearwardly from the housing so that the fisherman may release the ratchet wheel by applying downward pressure to the pawl through this arm, when desired. A spring 16 attached to the wall adjacent the wheel 12 engages the pawl 5 and constantly urges it into operative connection with the ratchet wheel.

Within the housing between the walls 6 is a line reel indicated generally by the numeral 17 and comprising a drum 18 having the side flanges 19 between which is wound up on the drum the fishing line 20. This reel 17 is merely supported upon the shaft 10 so that it may have free rotation thereabout.

Within the drum 18 is located a spiral spring 21 of the type commonly known as a clock spring and one end of this spring is secured to the shaft 10, as indicated at 22 in Fig. 2, while the other end is secured to the drum 18. As shown in Fig. 2, the spiral spring is set so that it will be placed under tension when a clockwise rotation is imparted to the shaft 10, and it will tend, when so tensioned, to impart clockwise rotation to the reel. The pawl and ratchet unit prevents the reverse rotation of the shaft 10 when the spring is placed under tension so that the forward or clockwise turning of the reel is made positive when the reel is released after the spring has been tensioned.

The flanges 19 of the reel are each provided at one point with a notch 23 and these notches are in alinement across the periphery of the reel.

The walls 6 of the reel housing are provided adjacent their top edges each with a series of apertures 24 and these apertures of one wall are alined transversely of the housing with apertures of the opposite wall to receive in anyone of several different positions a removable transversely extending trigger supporting pin 25.

The numeral 26 generally designates a trigger which is in the form of an elongated straight arm having at one end an inturned lip 27 and adjacent this lip the transversely extending bearing 28 through which the trigger supporting pin 25 passes. The rear end of the trigger is thus pivotally supported between the side walls 6 of the casing at the top thereof and when the trigger is in horizontal position, as shown in Fig. 2, the lip 27 may be brought into engagement in the notches 23 of the reel flanges to function to hold the reel against rotation under the urge of the spring 21. At the forward end of the trigger arm 26, a portion of the arm is downturned to form the transverse flange 29 through which is formed a line guide or eye 30.

In the use of the present automatic hook setting device the line 20 is wound on the reel so that it will be run off from and taken up at the under side of the reel. The line is then passed directly from the lowermost part of the reel through the guide 9 and then through the eye or guide 30 of the trigger arm and then run through the regular guides 3 of the fishing pole, in the customary manner. When a hook and weight or sinker have been applied to the line, a sufficient amount of line is tripped off so that the bait may sink to the desired depth, the pawl 13 being released during this operation so that the reel will turn freely. The reel is then brought to a position where the flange notches 23 may be engaged by the lip 27 of the trigger and the trigger is then oscillated to a position where such engagement can be effected, as shown in Fig. 2, the pawl and ratchet having previously been permitted to reengage and the reel crank 11 is then turned to twist the spiral spring and place it under tension, thereby causing the lip of the trigger to be firmly engaged in the notches of the reel flanges. The frictional engagement between the notches of the reel flanges and the lip of the trigger will thus maintain the trigger in set position while the spring is under tension and the fishing line instead of running straight out from the reel through the rod line guides, will be pulled up at an angle, as shown in Figs. 1 and 2. With the device set in this manner, it will be readily apparent that as soon as a slight pull is applied to the line 20 at any point beyond the trigger eye 30, as when a fish nibbles at or takes the hook which is attached to the line, the trigger will be caused to oscillate so as to raise the lip 27 out of engagement with the notches 23 whereupon the spring will instantly impart a sharp rotary motion to the reel which will jerk the line and, if the hook is in the proper position with respect to the mouth of the fish nibbling at the bait thereon, will set the hook in the fish's mouth.

What is claimed is:

1. An automatic fish hook setting device, comprising a fishing line reel, means rotatably supporting the reel, means providing a line guide adapted to be alined with line guides of a fishing pole, spring means connected with said reel and functioning when placed under tension to rotate the reel for the taking up of line thereon, a pivoted trigger supported adjacent the reel, means for coupling the trigger with the reel to maintain the latter against movement under the action of said spring, and means carried by the trigger forming a line guide which is out of alinement with said first-mentioned guides when the trigger is in reel securing position.

2. A fishing line retracting device, comprising a casing, means for mounting said casing upon a fishing rod, a line guide forming a part of the device arranged for alinement with line guides of the rod when the device is mounted on the rod, a line drum, a shaft rotatably supported transversely of the casing on which the drum is rotatably mounted within the casing, spring means coupling the shaft with the drum, means for turning the shaft to effect winding of the spring, means for maintaining the shaft against reverse rotation when the spring is wound, a trigger member pivotally supported on the casing, means for establishing a coupling between the trigger and the drum whereby the trigger maintains the drum against turning under the action of the spring, and means carried by the trigger forming a line guide which is out of alinement with the first-mentioned guides when the trigger is operatively coupled with the drum.

3. A fishing line take-up, comprising a casing, means for mounting the casing upon a fishing rod, a reel rotatably supported within the casing, a line guide adjacent the reel and arranged to be alined with guides upon the rod, spring means connected with the reel and operating when wound to rotate the reel in one direction for the taking up of a line thereon, means for turning the shaft to effect winding of the spring means, an elongated trigger arm pivotally supported upon the casing, means for frictionally coupling one end of the trigger arm with the reel to maintain the reel against rotation under the action of the spring means, said arm being substantially parallel with the supporting rod when operatively coupled with the reel and having its other end swung down toward the rod when out of connection with the reel, and means forming a line guide adjacent the other end of the trigger arm which is out of alinement with the first-mentioned guides when the trigger arm is operatively coupled with the reel.

4. An automatic fish hook setting device, comprising a rotatably supported fishing line reel having a flange, means providing a line guide adapted to be alined with line guides of a fishing pole, spring means connected with the reel and functioning when wound to rotate the reel for the taking up of line thereon through the line guide, said flange having a notch therein, a relatively long trigger arm pivoted adjacent the reel for oscillation on an axis paralleling the rotary axis of the reel, said arm having a downturned lip at its rear end adapted to be frictionally engaged in said notch, the arm having a line guide at its forward end, said spring means when wound functioning, when said lip is in said notch, to maintain firm frictional engagement between the lip and notch for maintaining the trigger arm in set position.

FLOYD ERWIN TILBURY.